United States Patent [19]

Ruiz

[11] Patent Number: 5,754,767
[45] Date of Patent: May 19, 1998

[54] METHOD FOR AUTOMATICALLY DETERMINING THE PHYSICAL LOCATION OF DEVICES ON A BUS NETWORKED CONTROL SYSTEM

[75] Inventor: John Ruiz, New Berlin, Wis.

[73] Assignee: Johnson Service Company, Milwaukee, Wis.

[21] Appl. No.: 707,727

[22] Filed: Sep. 4, 1996

[51] Int. Cl.$^6$ ..................................................... G06F 13/00
[52] U.S. Cl. ..................... 395/200.5; 395/200.53
[58] Field of Search ........................ 395/200.5, 200.51, 395/200.52, 200.53, 200.54, 200.68, 200.79, 200.81, 200.82; 370/254, 258

[56] References Cited

U.S. PATENT DOCUMENTS

| | | | |
|---|---|---|---|
| 4,916,444 | 4/1990 | King | 340/825.49 |
| 5,132,962 | 7/1992 | Hobgood et al. | 370/223 |
| 5,179,554 | 1/1993 | Lomicka et al. | 370/257 |
| 5,247,464 | 9/1993 | Curtis et al. | 364/562 |
| 5,335,227 | 8/1994 | Smith et al. | 370/258 |
| 5,444,851 | 8/1995 | Woest | 385/200.52 |

OTHER PUBLICATIONS

Echelon Corporation, *LonWorks*™ *Installation Overview*, ©1991, pp. 1–7.

Primary Examiner—Parshotam S. Lall
Assistant Examiner—Viet Vu
Attorney, Agent, or Firm—Dickey & Pierce, P.L.C.

[57] ABSTRACT

A method for determining the physical locations of devices located on a series connected network. A mapper routine located on the network severs a device from the network and then requests each device to respond with its respective node address to the mapper. Upon receiving the responses, the severed device is reattached to the network. This severing, requesting, and reattaching is performed for each remaining device on the network. The mapper routine determines the physical location of each device by correlating what responses from the devices were generated for which severed devices.

20 Claims, 2 Drawing Sheets

5,754,767

METHOD FOR AUTOMATICALLY DETERMINING THE PHYSICAL LOCATION OF DEVICES ON A BUS NETWORKED CONTROL SYSTEM

BACKGROUND OF THE INVENTION

1. Technical Field

The present invention relates generally to network control systems and more particularly to networked building HVAC control systems.

2. Discussion

Heating, Ventilation, and Air Conditioning (HVAC) networked control systems employ a greater number of HVAC control devices as a building's size increases in order to better control the building's environment. Due to aesthetic and safety reasons, these devices tend to be installed in inaccessible locations such as above the ceiling tiles of the building's rooms. The physical locations of the devices are required for inspecting, repairing or replacing the devices and are also used in displays and to control applications. The physical locations of the devices are also needed to determine where to execute specific control algorithms and to view on a user interface device. For example, a control algorithm should not be executed when it expects a heating device on a room without a heating element. However, the physical locations of the devices are difficult to ascertain at times other than when the devices are first installed.

Currently, the physical location of a device is determined by a technician writing the network communications address of the device on the installation drawings during installation. This typically entails a technician physically locating the device to access it. In some cases, this may be a time intensive task that requires a ladder to hunt for the physical locations of the devices within the building. In other cases these drawings are misplaced or wrong.

SUMMARY OF THE INVENTION

The present invention includes a method for determining the physical locations of a plurality of devices coupled to a series connected network. Each of the devices has an unique identifier on the network. The following steps are performed for each of the devices: severing a device from the network such that the series connection is blocked; sending queries to each of the devices for requesting the devices to provide identification responses, the queries being injected at a predefined node along the network; associating the identifier of the severed device with the responses from the queried devices; and reattaching the severed device to the network. After those steps have completed, the physical locations of the devices are determined based on the responses and the associated identifier of the severed device. The responses are indicative of the physical locations of the queried devices relative to the severed devices.

BRIEF DESCRIPTION OF THE DRAWINGS

Additional advantages and features of the present invention will become apparent from the subsequent description and the appended claims, taken in conjunction with the accompanying drawings in which:

DETAILED DESCRIPTION OF THE PREFERRED EMBODIMENTS

Figure 1:
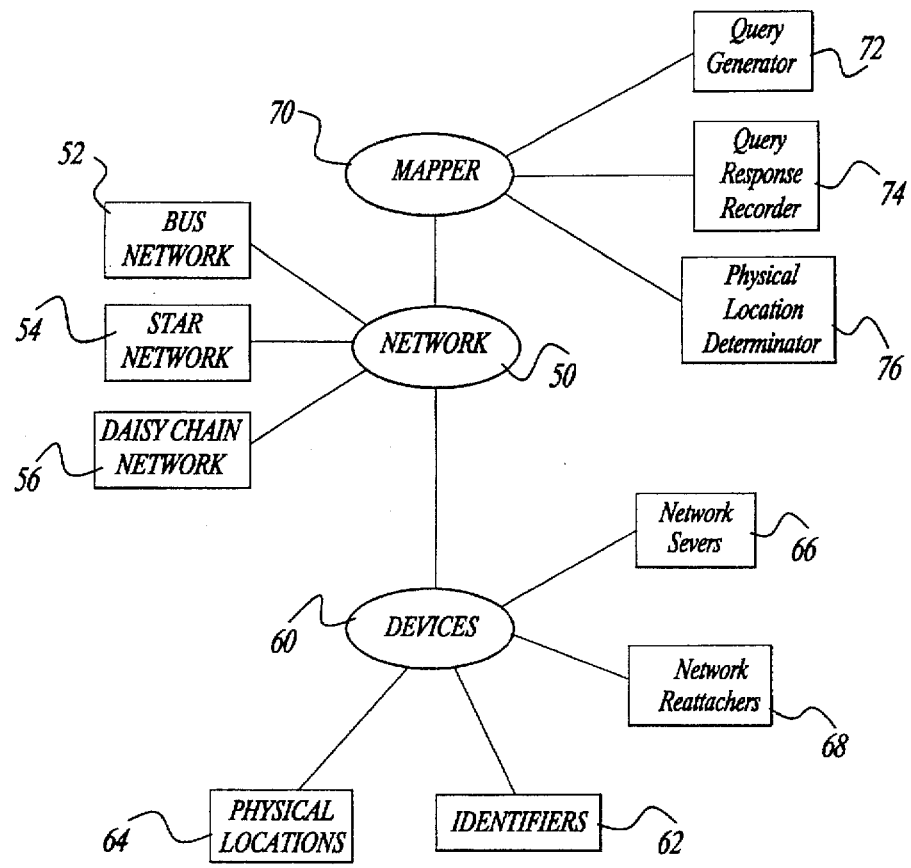
FIG. 1 is an entity relationship diagram depicting the interrelationships which exist among the components of the present invention.

FIG. 1 shows the components of the present invention and how they interrelate. A series connected network 50 connects devices 60 whose physical locations are determined by a Mapper 70.

First, the network 50 of the present invention may assume the following topologies: a bus network 52; a ring network 54; or a daisy chain network 56. In such networks, a device on the network 50 acts as a conduit for messages for other devices on the network 50.

Secondly, the present invention includes such devices 60 as HVAC building control devices. These control devices may control a damper for varying air flow to a building's room or zone. Other devices include hot water valve controllers which control the heating of a building's room or zone. It is to be understood that the present invention is not limited to HVAC control devices and to HVAC control networks, but includes other series connected networks which have uses other than HVAC control.

The devices 60 have network communication addresses which serve as identifiers 62 for uniquely identifying the devices 60. In some communications integrated circuits, an address is configured into the computer chip of the devices while in other devices this address can be supplied during factory programming of the devices or assigned during installation.

The devices 60 have physical locations 64 on the network 50 which is channeled throughout a building. The present invention includes network severers 66 which have the capability of severing the network to isolate devices on either side of the severing (that is, an electrical open circuit on the network). Also network reattachers 68 restore the device's normal communications on the network 50.

In the preferred embodiment, all devices 60 can sever the network 50 using a switch internal to each device. The network severers may be electrical relays or triac transistors operable as a switch or dry contact relays such as may be purchased from Siemens, International Rectifier, and others. Also, the impedance of the network 50 should be matched by the severing device to the active side of the network. This can normally be done with an inexpensive resistor or resistor/capacitor circuit. The network can be terminated using an internal or external switch. An impedance matching resistor or resistor/capacitor should be placed across the open circuit on the side of the mapper to prevent messages from being attenuated. This is not normally necessary on short networks or on networks that already balance the network when a device fails or the trunk is cut.

Thirdly, a Mapper 70 utilizes the network communications among the devices 60 to determine the physical locations 64 of the devices 60 on the network 50. The query generator 72 of the Mapper 70 commands each device in turn to sever itself from the network so that the query generator 72 can broadcast across the network requests for address information from each device. A query response recorder 74 records if for a particular severed device, other devices respond to the address requests from the query generator 72. A physical location determinator 76 determines the physical location of each device on the network based on the device responses for a severed device.

The physical location of one device on the network needs to be known and accessible. This detail is usually not difficult to satisfy since a supervisory controller device is normally connected to a building control system and its location is both known and accessible to a service technician. Also, the devices 60 need to be configured to broadcast their address on the network when requested by the Mapper 70.

An operational scenario which illustrates the present invention includes when the building HVAC control system is being configured as when the devices 60 have recently been installed in a building. A service technician goes to a physically accessible device which can also operate the Mapper 70 and requests that the Mapper 70 generate a physical location map of the devices 60.

Figure 2:
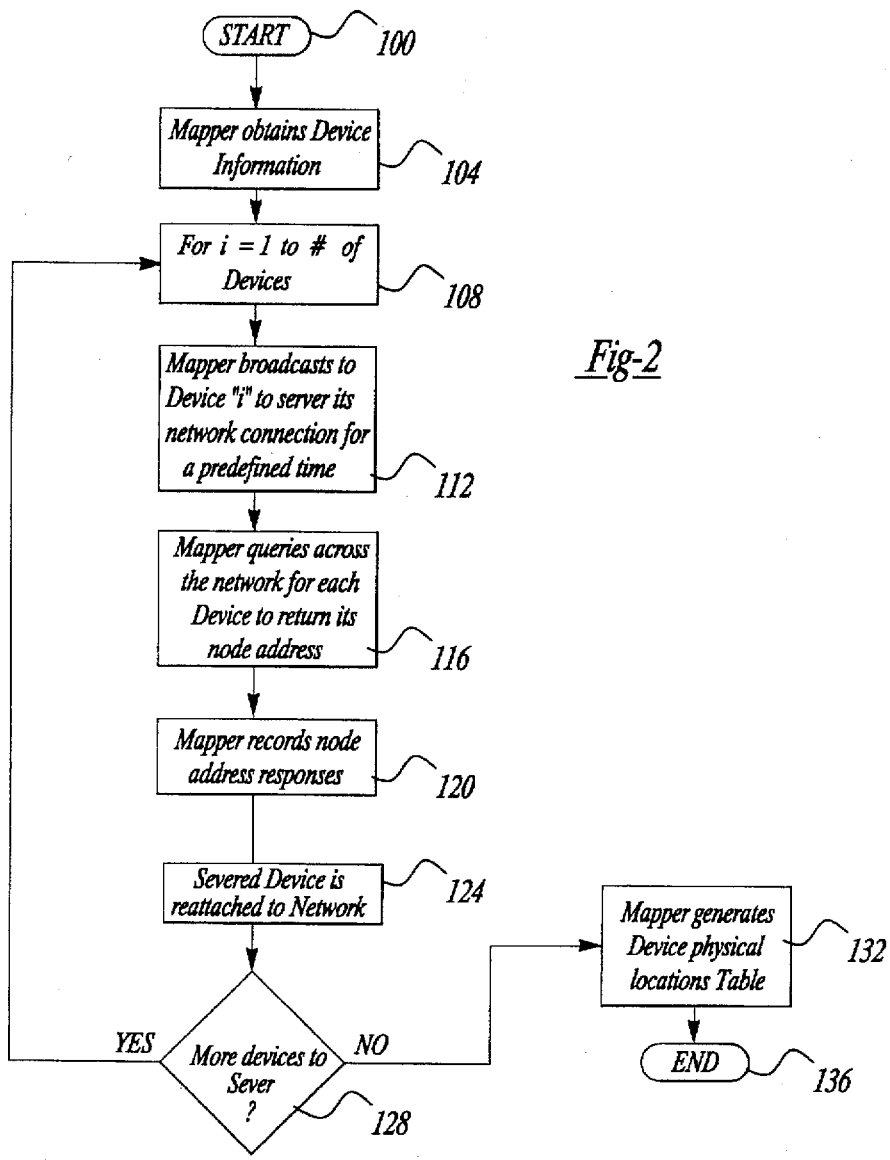
FIG. 2 is a flow chart depicting the functional sequence for locating the physical locations of devices on a series connected network.

FIG. 2 provides the functional sequence which the present invention follows upon a request to map the physical locations. The start indicator 100 indicates that at block 104 the Mapper obtains such device information as the number of devices on the network and the addresses of each of the devices. This information can be obtained by the Mapper broadcasting to each device a request to provide to the Mapper their addresses before any of the devices have been severed.

Iterative start block 108 performs a number of operations for each device until the iterative stop block 128 terminates the iterative loop. At block 112, the Mapper broadcasts over the network that a selected device is to sever its network connection for a predefined period of time. For the preferred embodiment, the predefined period of time is the period of time equal to the number of devices on the network multiplied by the longest time it takes to perform an address query and response. At block 116, the Mapper queries across the network for each device to return its node address. The Mapper records at block 120 the node address response of the device. At block 124, the severed device is reattached to the network. The iterative stop block 128 determines whether all of the devices have been severed.

If all of the devices have not been severed, then operation returns to the iterative start block 108 to complete the iterative loop. If all of the devices have been severed in their respective turn, then processing continues at block 132 where the Mapper generates the device physical locations table. The table contains the physical locations of the devices based upon the devices' response when each device had been severed. Processing terminates at the end indicator 136.

Figure 3:
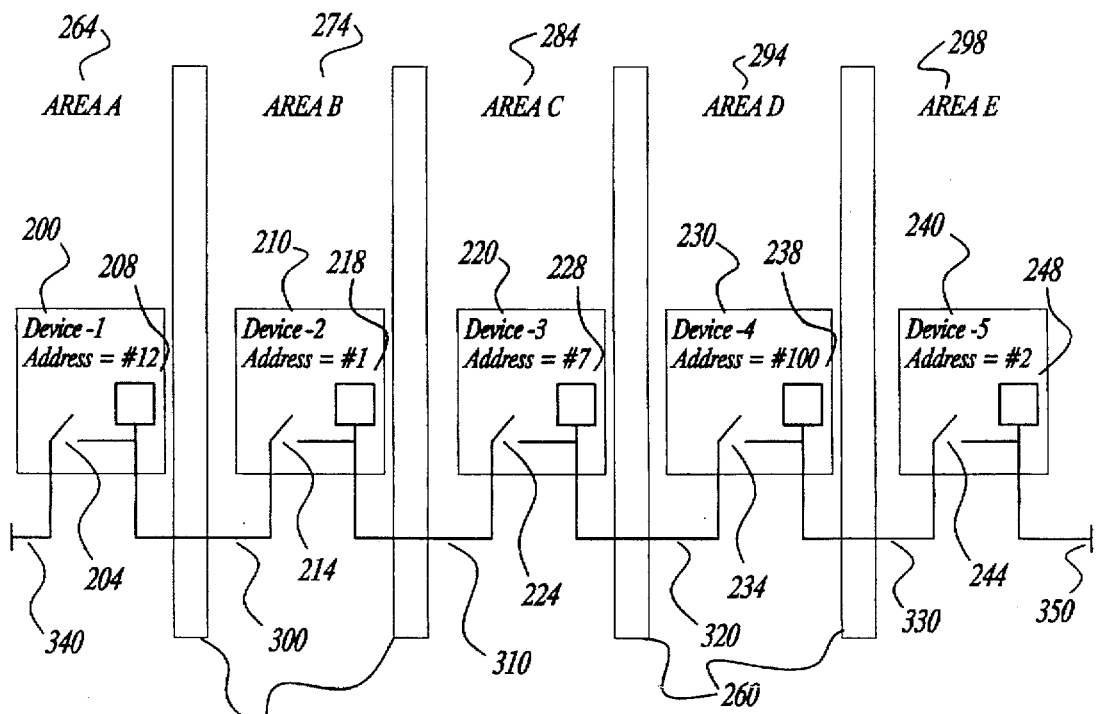
FIG. 3 is a network schematic depicting the control devices on a HVAC building control network.

FIG. 3 shows an embodiment of a network arrangement which includes the Mapper. It is to be understood that other network arrangements are included in the present invention, such as using a ring network arrangement.

In the example depicted in FIG. 3, there are five devices: device-1 200 with a node address value of "#12"; device-2 210 with a node address value of "#1"; device-3 220 with a node address value of "#7"; device-4 230 with a node address value of "#100"; and device-5 240 with a node address value of "#2". For this example, the Mapper's node address is node address #7 which is device-3 220.

In the preferred embodiment, each device has an internal switch to sever itself from the network: device-1 200 has switch 204; device-2 210 has switch 214; device-3 220 has switch 224; device-4 230 has switch 234; and device-5 240 has switch 244. It is to be understood that the present invention is not limited to only an internal switching mechanism to sever a device from the network. Rather, the present invention includes such other methods as software routines to effect a severing.

Each device has a communications package connected to one side of the switch in order to communicate with the network: device-1 200 has communications package 208; device-2 210 has communications package 218; device-3 220 has communications package 228; device-4 230 has communications package 238; and device-5 240 has communications package 248. Also, each device occupies a distinct area of a building and are enclosed by walls 260.

The present invention uses a series connected network topology to determine the physical locations of the devices: device-1 200 is connected to device-2 210 by cable 300; device-2 210 is connected to device-3 220 by cable 310; device-3 220 is connected to device-4 230 by cable 320; and device-4 230 is connected to device-5 240 by cable 330. Device-1 200 has a network terminator cable 340 and device-5 240 has a network terminator cable 350. This arrangement serves to illustrate the terms "downstream" and "upstream" within the context of the present invention. For example, device-2 210 is considered "downstream" relative to device-3 220 but is considered "upstream" relative to device-1 200.

For this embodiment, a severed device is still able to communicate with the Mapper along the network provided that its communication package is still connected to the Mapper along the network. For example when device-2 210 has been severed, device-2 210 is able to still use its communications package 218 to respond to queries by the Mapper located on device-3 220. However if device-4 230 has been severed, then device-4 230 cannot use its communications package 238 to respond to queries by the Mapper located on device-3 220 since communications package 238 has no lines of communications connected to the Mapper.

After the Mapper has first obtained the addresses of each of the devices on the network and has stored them as an address map table, the Mapper commands a predetermined device to sever its network connection for a period of time equal to the number of devices on the network multiplied by the longest time it takes to perform an address query and response. Typical values for this period of time for this embodiment would be on the order of 10–1000 ms.

For the preferred embodiment, the Mapper starts the severing process by severing its own node which is at node address #7. When it severs its own node for the predetermined time, node address #1 and node address #12 are on one side of the sever and node addresses #2, #7, and #100 are on the other side. Since the Mapper knows that it has severed the network from its left side, the Mapper also knows that node addresses #1 and #12 are on its left and node addresses #2, #7, and #100 are on its right.

During the process, the Mapper looks at one side of the network and determines which node address is downstream from each device on this subsection of the network. For example if node address #12 is severed, node address #1 can still communicate with the Mapper. Therefore, node address #1 is closer to the Mapper than node address #12. This completes the determination of the physical locations of the devices to the left of the Mapper since the Mapper has determined that to the left of Mapper is node address #1 and then node address #12. The same process is repeated for the right side of the network.

Following completion of the process for each device, the Mapper generates the following device response table (where an "X" in the table indicates that a response to a query was received):

|                 | WHICH NODE WAS SEVERED |    |    |     |      |
| RESPONDING NODE | #1 | #2 | #7 | #12 | #100 |
|---|---|---|---|---|---|
| #1   | X | X |   | X | X |
| #2   | X | X | X | X |   |
| #7   | X | X | X | X | X |
| #12  |   | X |   | X | X |
| #100 | X | X | X | X |   |

The Mapper builds a device physical locations table by determining which node addresses were further downstream from each device. This allows the Mapper to list the addresses of the devices as where they appear along the network as shown in the following physical locations table:

| #12 | #1 | #7 | #100 | #2 |
|---|---|---|---|---|

This information can then be used (in conjunction, for example, with an installation drawing) to identify the mapping between the physical location of a device and its communication address.

Figure 4:
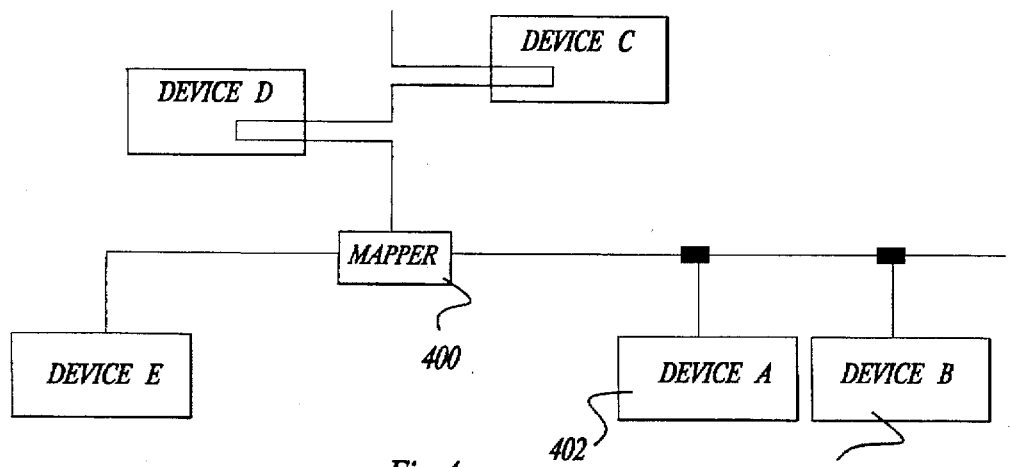
FIG. 4 is a network schematic depicting the present invention in a star topology.

FIG. 4 shows one way in which the present invention can be used in a star network topology. The Mapper 400 is at the hub location of the star network. At such a location, Mapper 400 can determine the locations of such devices as device A 402 and device B 404 in accordance with the present invention.

The embodiments which have been set forth above were for the purpose of illustration and were not intended to limit the invention. It will be appreciated by those skilled in the art that various changes and modifications may be made to the embodiments described in this specification without departing from the spirit and scope of the invention as defined by the appended claims.

It is claimed:

1. A method for determining the physical locations of a plurality of devices coupled to a series connected network, each of said devices having an unique identifier on said network, comprising the steps:

(a) performing the following steps (b)–(e) for each of said devices:

(b) severing a device from said network such that the series connection is blocked;

(c) sending queries to each of said devices for requesting said devices to provide identification responses, said queries being injected at a predefined node along said network;

(d) associating the identifier of said severed device with said responses from said queried devices;

(e) reattaching said severed device to said network; and (f) after completing steps (a)–(e), determining physical locations of said devices based on said responses and said associated identifier of the severed device, said responses being indicative of said physical locations of said queried devices relative to said severed devices.

2. The method of claim 1 wherein each of said device being capable of severing itself from said network.

3. The method of claim 1 wherein said identifier is a node address of a device on said network.

4. The method of claim 3 wherein said determined physical locations are based on said responses and said node address of said device.

5. The method of claim 1 wherein said network is one of the following networks: a bus network, star network, or daisy chain network, or ring network.

6. The method of claim 1 wherein said network is a ring network.

7. The method of claim 1 wherein said network is a daisy chain network.

8. The method of claim 1 wherein said devices are HVAC control devices on said network, said network being an HVAC building control network.

9. The method of claim 1 further comprising the step of:

obtaining device information from said devices before said severing step (b), said device information containing node address information from each of said devices.

10. The method of claim 1 wherein said blocked series connection prevents said queries from reaching a device which is further downstream on said network relative to said severed device and to said query generator, said predefined node having its physical location known without performing said steps (a)–(e).

11. An apparatus for determining the physical locations of a plurality of devices coupled to a series connected network, each of said devices having an unique identifier on said network, comprising:

a network severer connected to said devices for severing devices from said network such that the series connection is blocked;

a query generator connected to said network severer and to said network for indicating to said network severer to sever a device from said network and for sending queries to said devices, said queries being injected at a predefined node along said network;

a query response recorder connected to said network for associating the identifier of said severed device with said responses from said queried devices;

a network reattacher connected to said devices for reattaching to said network said severed devices; and a physical location determinator connected to said query response recorder for determining physical locations of said devices based on said responses and said associated identifier of the severed device, said responses being indicative of said physical locations of said queried devices relative to said severed devices.

12. The apparatus of claim 11 wherein each of said devices having said network reattacher as a switch internal to each of said devices for severing itself from said network.

13. The apparatus of claim 11 wherein said identifier is a node address of a device on said network.

14. The apparatus of claim 13 wherein said determined physical locations are based on said responses and said node address of said device.

15. The apparatus of claim 11 wherein said network is a bus network.

16. The apparatus of claim 11 wherein said network is a ring network.

17. The apparatus of claim 11 wherein said network is a daisy chain network.

18. The apparatus of claim 11 wherein said devices are HVAC control devices on said network, said network being an HVAC building control network.

19. The apparatus of claim 11 further including:

means for obtaining device information from said devices any of said devices had been severed, said device information containing node address information from each of said devices.

20. The apparatus of claim 11 wherein said blocked series connection prevents said queries from reaching a device which is further downstream on said network relative to said severed device and to said query generator, said predefined node having its physical location on said network identified without said physical location determinator having to determine physical location of said query generator.

* * * * *